Patented Feb. 8, 1944

2,341,426

UNITED STATES PATENT OFFICE 2,341,426

PLASTER COMPOSITION AND PROCESS

Manvel C. Dailey, Elmhurst, Ill., assignor to United States Gypsum Company, Chicago, Ill., a corporation of Illinois No Drawing. Application September 30, 1940, Serial No. 359,693

11 Claims. (Cl. 106—110)

This invention relates to a composition of matter and process of making the same. More particularly, it relates to an improved calcined gypsum plastic composition and process for preparing it, which composition is particularly suitable for use in forming molds where fidelity, accuracy of impression, and long mold life are desirable, such as for example in pottery molds, artificial stone molds, and the like.

In the past it has been impractical to produce a pottery or industrial molding plaster possessing a normal consistency below about 60 cubic centimeters (normal consistency being herein defined as the number of cubic centimeters of water which, when mixed with 100 grams of plaster, will produce a slurry of such fluidity that it will just pour from a cup). Ordinary calcined gypsum which is prepared according to the usual prior art process in a kettle calciner or rotary calciner at normal atmospheric temperatures may be ground sufficiently fine to produce casts having desired finish, smoothness, plasticity, freedom from pin holes, etc. However, when this type of gypsum is ground to this desired degree of fineness, the consistency of the product is above about 60 cubic centimeters. For many uses it is desirable that a casting plaster have a normal consistency of less than 60 cubic centimeters. Heretofore there have been no means of meeting such a need for such a product.

The plasters which have been heretofore used in the art for the preparation of casts and molds are prepared in accordance with the old prior art methods of direct calcination of calcium sulfate dihydrate at ordinary atmospheric pressures in kettle or rotary calciners. These plasters, which I herein designate as "normal pottery plaster," are composed principally of calcium sulfate hemihydrate prepared by direct calcination at substantially atmospheric pressures, and comminution of the resulting product to a degree of fineness such as to produce a plaster suitable for mold casting purposes. Examples of methods of producing "normal pottery plaster" as herein defined are: (1) Ground gypsum rock is calcined in a calcining kettle in the presence of a small amount of a hygroscopic salt, such as calcium chloride, which may be added during or preceding the calcination. The calcium chloride is added to produce a pre-aged low consistency product and the calcination is carried to the point of producing calcium sulfate hemihydrate. After calcination, the product may be ground to the desired degree of fineness. (2) The calcination of gypsum rock may be effected as indicated in the foregoing example except that the addition of hygroscopic salt is omitted and the calcination is carried out at a higher temperature or for a longer period of time to permit the formation of a substantial amount of soluble anhydrous calcium sulfate. This product may be ground or comminuted to the desired degree of fineness and aged by exposure to the air prior to use. Such aging results in the formation of the hemihydrate from the soluble anhydrite due to the reaction of the anhydrite with moisture contained in the air in accordance with the following equation:

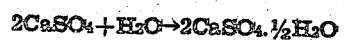

$$2CaSO_4 + H_2O \rightarrow 2CaSO_4 \cdot \tfrac{1}{2} H_2O$$

(3) The same process as indicated in the foregoing Example 2 except that lump or granular gypsum is employed as a raw material and the calcination is effected in the usual type of rotary calciner.

The products prepared in accordance with the above indicated methods are all closely similar in physical and chemical characteristics, and to all of them I apply the descriptive term "normal pottery plasters." It is clear, however, that such normal pottery plasters may be prepared by a number of other methods which are well known in the art, and the term as used herein may refer to any calcium sulfate hemihydrate which is produced by calcination at substantially atmospheric pressures and which is treated to produce a plaster which may be used in making casting molds in accordance with the prior art methods.

However, as indicated above, these prior art compositions are not entirely suitable for casting plasters because of the fact that when they are ground to a sufficient degree of fineness to form a smooth surface on the resulting cast, the normal consistency of the product is raised beyond the desired point for many uses.

In the past, attempts have been made to prepare casting plasters by mixing normal pottery plaster as above defined with a type of calcium sulfate hemihydrate which is known in the art as alpha gypsum. (Alpha gypsum may be prepared by calcining calcium sulfate dihydrate under superatmospheric pressure as disclosed in United States Patents Nos. 1,901,051 and 1,931,240 to Randel and Dailey. Alpha gypsum is entirely different from ordinary calcined gypsum prepared by the usual calcining methods, and is characterized by its normal low consistency and ability to form set products having very high strength.) Such attempts have ben unsatisfactory, because after a short period of use the molds have a tendency to develop rough finished surfaces. The alpha gypsum that has been used in these mixes in the past has contained a certain amount of coarse material and usually about 2 to 3 per cent of material which will not pass through a 100 mesh screen.

It is therefore an object of this invention to provide a plastic composition that is adapted to wear uniformly without development of rough surfaces or high spots in the casting mold during use.

A further object of this invention is to provide means for making pottery plasters castable as mixed at varying water ratios to obtain desired strength, rate of absorption and other desirable physical characteristics necessary in mold production.

A still further object of this invention is to provide a plastic composition comprising substantially entirely calcium sulfate hemihydrate which when mixed with water produces a slurry substantially free from small bubbles of occluded air and which therefore can be used to produce molds whose surfaces will not develop pin holes in use.

Another object of this invention is to provide a type of calcium sulfate hemihydrate characterized by its ability to rehydrate to a product which will resist recalcination.

A still further object of this invention is to provide a plastic composition particularly suitable for use as a pottery plaster capable of lowering mold costs and increasing economy in use by improved working, mixing and aging properties, better uniformity, increased life, and adaptability to a number of specific uses in the pottery industry.

Further and additional objects will appear from the following description and the appended claims.

In accordance with this invention a casting plaster is prepared by adding to a normal pottery plaster a substantial amount of finely comminuted alpha gypsum, the alpha gypsum being comminuted to such an extent that it is substantially free from particles coarser than those which will just pass through a 100 mesh screen. I have discovered that the reason for the development of rough mold surfaces on molds made from mixtures of alpha gypsum and pottery plaster is due to the differential rate of wear on such surfaces. The softer and weaker portions of the surfaces comprising rehydrated normal pottery plaster wear at a faster rate than the harder, denser coarse particles of rehydrated alpha gypsum which are surrounded by the relatively softer matrix of the former. Thus, after a short period of use, the hard coarse particles of hydrated alpha gypsum project above the mold surface, causing "high spots" or mold roughness. This roughness is transferred to the surface of clay ware formed by the mold and, when the roughness becomes appreciable, the molds must be discarded.

I have found that alpha gypsum particles, coarser than approximately 150 micron average diameter (plus 100 mesh), are sufficiently large to cause the development of rough mold surfaces. However, satisfactory molds are obtained if substantially all of the particles greater than 150 microns average diameter (plus 100 mesh) are removed, and even better results are obtained if substantially all of the particles having an average diameter of greater than 75 microns are removed. In any case, not more than 0.5% of the alpha gypsum should comprise particles greater than 150 microns average diameter; that is, less than 0.5% of the alpha gypsum should be retained by a 100 mesh screen. Molds made from a mixture of normal pottery plaster and this finely comminuted alpha gypsum containing no particles coarser than the sizes indicated wear smoothly and evenly in use without the development of rough surfaces, since there are no particles present of sufficient size to permit high spots to develop and project above the normal mold surface.

Normal pottery plaster now commonly used contains a considerable proportion of particulate material coarser than 100 mesh. Rough mold surface development caused by the presence of such large particles in normal pottery plaster is not as pronounced as in a normal pottery plaster-alpha gypsum mix. Large particles in ordinary calcined gypsum (excluding impurities) are composed of agglomerates of myriads of exceedingly fine calcium sulfate hemihydrate crystals. The size of individual crystals making up these agglomerates does not exceed 2 to 5 microns in average diameter. When mixed with water, the aggregates break down into individual crystals, so that, when hydration occurs, a matrix of uniformly dispersed very fine gypsum crystals is formed. On the other hand, coarse particles of alpha gypsum are not loosely bound aggregates or agglomerates of individual crystals. Each particle is an individual crystal or crystal fragment in itself. When hydration of this product occurs, gypsum crystals grow from these fragments, the crystals being very dense at their center of formation adjacent the original hemihydrate crystal nucleus. For this reason, therefore, the presence of a small number of coarse particles in alpha gypsum is more deleterious than the presence of a similar number of like-sized coarse particles in the normally calcined pottery plaster.

As previously indicated, casting plasters have been prepared from normal pottery plaster. The plaster may be ground and air-separated to such an extent that approximately 100 per cent of it will pass through a 100 mesh screen. However, normal pottery plaster of this type, having no alpha gypsum incorporated therewith, is unsatisfactory for the following reasons: (1) Grinding or air-separation to produce the desired degree of fineness results in an increase in consistency of approximately 6 to 10 cubic centimeters in the finished product. This is undesirable because increased amounts of mixing water are necessary which results in set casts or molds having lower density, increased absorption, lower strength, and greater rate of wear in use. (2) Such very fine plaster is highly plastic and difficult to mix to a smooth syrupy consistency in actual use.

These two disadvantages are avoided by my herein disclosed process. Finely ground alpha gypsum of the type herein proposed for use, screening substantially 100 per cent through 100 mesh (less than 150 microns average diameter), possesses a normal consistency of between about 40 and 45 cubic centimeters due to the crystalline nature of the alpha gypsum. It is readily soaked and mixed even when finely ground. A mixture of 30 per cent of finely ground alpha gypsum and 70 per cent of air-separated finely ground normal pottery plaster is an excellent casting plaster which soaks and mixes easily to a smooth creamy mix, free from lumps and pin holes. Such a mix may be used to form molds which wear uniformly in use without the production or development of rough surfaces and high spots on the mold surface. Due to this fact and also due to the fact that my improved casting plaster possesses considerably greater strength and resistance to abrasion than present types of casting plaster, such as that prepared from normal pottery plaster, mold life may be increased up to 300 or 400 per cent.

For certain types of pottery molds such as cup molds, cup handle molds, jigger molds, etc., heavier and denser plaster molds than those which have been formerly obtainable are desirable. Such molds, due to their greater density, are more resistant to effects of abrasion and solution than are the lighter weight molds prepared in accordance with prior art methods. On the other hand, other types of pottery molds are sometimes desired which will possess a high rate of water absorption and a high total water absorption. These latter types of molds may be prepared from high consistency plaster. Specifically, molds of this latter type are employed in the so-called slip casting process where a thin slurry of clay is poured within the plaster molds, the plaster acting to absorb excess water from the clay slip, whereby a thin film of solidified clay ware is formed on the mold surface. Therefore, it is seen that it is desirable to have available in a pottery variable casting plasters of varying consistencies for varying types of molds. This invention renders possible the attainment of this desideratum by varying the proportion of finely ground alpha gypsum which must be added to the finely ground normal pottery plaster to obtain a casting plaster having the desired consistency. By varying relative proportions of these two ingredients, I have found it possible to produce pottery plasters of any desired consistency within the range of 44 to 70 cubic centimeters. Therefore, by following the teaching of this invention, any pottery can produce molds of maximum utility and life under all conditions which are encountered in the pottery.

The addition of finely ground alpha gypsum in amounts in excess of 10 per cent of the normal pottery plaster present increases the resistance of the molds cast from such mixes to calcination under drying conditions which are encountered in potteries where drying of molds is desirable in order to permit rapid re-use thereof. By using a plaster which will produce molds that are more resistant to calcination under severe drying conditions, more rapid re-use of molds is possible. I have discovered that a mold prepared from finely ground alpha gypsum and normal pottery plaster in accordance with this invention is considerably more resistant to calcination than molds which are prepared in accordance with the prior art processes from only normal pottery plaster without the addition of alpha gypsum. A casting mold prepared from 100 per cent normal pottery plaster and a casting prepared from a mixture of 70 per cent normal pottery plaster and 30 per cent finely comminuted alpha gypsum were placed in a drier maintained at 150° F., 5 per cent relative humidity, having an air velocity of 300 feet per minute. At different intervals of time the per cent of gypsum dehydrated in each mold was determined. The results of these analyses appear in Table No. 1.

Table No. 1

| Time of exposure, hrs. | Per cent gypsum dehydrated | |
|---|---|---|
| | 100% regular pottery | 70% pottery, 30% alpha gypsum |
| 10 | 1.12 | 0.88 |
| 20 | 2.01 | 1.62 |
| 30 | 2.72 | 2.24 |
| 42½ | 3.35 | 2.62 |
| 55 | 4.00 | 3.07 |
| 67 | 6.28 | 4.88 |
| 80 | 10.00 | 7.48 |
| 91 | 13.02 | 10.19 |
| 125 | 22.05 | 18.74 |
| 163 | 32.10 | 28.25 |

It is thus clear from the results indicated in Table No. 1 that a casting prepared by my improved plaster is superior to that formed from normal pottery plaster in respect to its property of resisting calcination.

For production of an improved pottery plaster possessing approximately the same consistency as certain types of presently used pottery plaster, I employ a mixture of approximately 30 per cent alpha gypsum, screening approximately 100 per cent through 200 mesh, and 70 per cent kettle-calcined, reground and air-separated normal pottery plaster, screening approximately 100 per cent through 100 mesh. The relative consistencies of the two ingredients separately are about 40 to 45 cubic centimeters for the alpha gypsum, and 62 to 67 cubic centimeters for the pottery plaster. The consistency of the mix in the proportions indicated above is approximately 60 cubic centimeters, which is normal for certain types of casting plasters as has been indicated. By increasing the proportion of alpha gypsum, the consistency of the finished mix may be reduced to as low as 40 to 44 cubic centimeters, and by decreasing the proportion of alpha gypsum, the consistency of the finished plaster may be raised to approximately 62 to 67 cubic centimeters as desired.

To obtain alpha gypsum of the type described for use in the casting plaster of this invention, I prefer to prepare it in accordance with the methods disclosed in Randel and Dailey Patent No. 1,901,051 and Randel and Dailey Patent No. 1,931,240. The dried alpha gypsum product thus formed is then reduced to a fine powder by any desirable combination of grinding methods, such as for example, a hammer mill or attrition mill, preferably followed by ball milling or tube milling. The product at this stage normally screens approximately 80 to 90 per cent through a 325 mesh screen, but still contains 1 to 3 per cent which will not pass a 100 mesh screen, and 5 to 7 per cent which will not pass a 200 mesh screen. The material is then passed through an air-separator which is adjusted to remove substantially all of the particles of alpha gypsum, coarser than those which will pass 200 mesh (greater than 75 microns average diameter). The finished product then screens approximately 100 per cent through 200 mesh and 90 to 95 per cent through 325 mesh. Of course, if desired, the entire mass of material may be ground so fine that the desired degree of fineness is obtained without the use of air-separation or mechanical screening. However, in commercial practice it has been found preferable to employ air-separation to remove the coarser particles.

While most of the benefits of the present invention may be obtained by employing a mix comprising less than 100 mesh size alpha gypsum and normal pottery plaster, I have found it advisable to also employ normal pottery plaster containing substantially no particles greater than those which would pass through a 100 mesh screen. Either air-separation or prolonged grinding may be employed to produce a normal pottery plaster having this degree of fineness. In commercial practice an air-separator is generally used. Air-separation of normal pottery plaster removes traces of coarse impurities naturally occurring in gypsum rock, such as anhydrite, limestone, shale, and the like. These impurities are undesirable, because if they exceed a size greater than that which would pass through a 100 mesh screen, they tend to cause formation of high spots in the finished molds.

The improved casting plaster of this invention may be prepared directly at the manufacturing plant or the major ingredients, that is, the alpha gypsum and the normal pottery plaster, may be distributed separately to potteries or other users for preparation of the final mix in the relative proportions desired by the user. The constituents of the mix may be separately ground, screened or air-separated prior to mixing, or the mixture may be so processed, if desired.

It is obvious that the qualities of the new plaster prepared in accordance with this invention make it suitable for other uses than for the preparation of pottery molds. For example, the mixture may be employed for molding plasters, gauging plasters, dental plasters, and the like. Mold life of cast stone molds is greatly increased by this improved product.

If desired, small amounts of other ingredients may be incorporated with the plaster of this invention to control such properties as setting time, setting expansion, mold surface hardness, and the like. Such ingredients may include ground raw gypsum, potassium sulfate, Portland cement, hydrated lime, commercial retarder, gum arabic, dextrin, boric acid, and the like.

While a particular embodiment of this invention is shown above, it will be understood, of course, that the invention is not to be limited thereto, since many modifications may be made, and it is contemplated, therefore, by the appended claims, to cover any such modifications as fall within the true spirit and scope of this invention.

I claim:

1. An improved casting plaster comprising a mixture of finely comminuted alpha gypsum, substantially all of the particles of which will pass through a 100 mesh screen, and finely comminuted normal pottery plaster.

2. An improved casting plaster comprising a finely comminuted mixture of alpha gypsum and normal pottery plaster, the particles of such mixture being of such size that substantially all of them will pass through a 100 mesh screen.

3. An improved casting plaster comprising a mixture of finely comminuted alpha gypsum, substantially all of the particles of which have a size less than 150 microns average diameter, and finely comminuted calcium sulfate hemihydrate calcined under normal atmospheric pressure.

4. An improved casting plaster comprising a finely comminuted mixture of alpha gypsum and calcium sulfate hemihydrate calcined under normal atmospheric pressure, said mixture containing not over 0.5 per cent of material coarser than 100 mesh.

5. The casting plaster recited in claim 3 wherein substantially all of the particles of alpha gypsum are less than about 75 microns average diameter.

6. The casting plaster recited in claim 3 having incorporated therewith small quantities of set modifying ingredients.

7. An improved casting plaster comprising a mixture of about 30 per cent by weight of alpha gypsum, substantially all of the particles of which will pass through a 100 mesh screen, and about 70 per cent by weight of calcium sulfate hemihydrate calcined under normal atmospheric pressure.

8. An improved casting plaster comprising a mixture of about 30 per cent by weight of alpha gypsum and about 70 per cent by weight of calcium sulfate hemihydrate calcined under normal atmospheric pressure, said mixture containing not over 0.5 per cent of particles having an average diameter greater than about 150 microns.

9. An improved casting plaster comprising a mixture of alpha gypsum and calcium sulfate hemihydrate calcined under normal atmospheric pressure, said mixture comprising finely comminuted particles of a degree of fineness such that less than 0.5 per cent of the particles are coarser than 150 microns average diameter.

10. An improved plaster comprising a finely comminuted mixture of alpha gypsum and calcium sulfate hemihydrate calcined under normal atmospheric pressure, said mixture consisting of particles of such size that less than 0.5 per cent of them are coarser than about 150 microns average diameter, and said mixture containing a sufficient proportion of alpha gypsum to lower the normal consistency thereof to less than 60 cubic centimeters.

11. A process of producing an improved casting plaster comprising mixing alpha gypsum and calcium sulfate hemihydrate calcined at normal atmospheric pressure, finely comminuting the mixture, air-separating the resulting mass, and separately collecting as the desired product that portion of the mass consisting substantially entirely of particles having an average diameter of less than about 150 microns.

MANVEL C. DAILEY.